(12) United States Patent
Deike et al.

(10) Patent No.: US 6,240,430 B1
(45) Date of Patent: *May 29, 2001

(54) METHOD OF MULTIPLE TEXT SELECTION AND MANIPULATION

(75) Inventors: Kevin W. Deike, Roundrock; Hatim Y. Amro, Austin, both of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/764,815

(22) Filed: Dec. 13, 1996

(51) Int. Cl.$^7$ ................................................ G06F 17/24
(52) U.S. Cl. .......................................... 707/539; 707/531
(58) Field of Search .................................. 707/520, 530, 707/531, 539, 540; 345/333, 339, 348

(56) References Cited

U.S. PATENT DOCUMENTS

| | | | |
|---|---|---|---|
| 4,723,211 | 2/1988 | Barker et al. | 707/514 |
| 4,739,477 | 4/1988 | Barker et al. | 707/100 |
| 4,815,029 | 3/1989 | Barker et al. | 707/516 |
| 5,530,865 | 6/1996 | Owens et al. | 705/539 |
| 5,574,840 | * 11/1996 | Kwatinetz et al. | 707/531 |
| 5,664,127 | * 9/1997 | Anderson et al. | 345/333 |
| 5,664,210 | * 9/1997 | Fleming et al. | 707/531 |
| 5,666,552 | * 9/1997 | Greyson et al. | 707/539 |
| 5,694,151 | * 12/1997 | Johnston, Jr. et al. | 345/145 |

OTHER PUBLICATIONS

Cowart, *Mastering, Windows™ 3.1 Special Edition*, SYBEX Corporation, 1993, pp. 123–126.*

* cited by examiner

*Primary Examiner*—Stephen S. Hong
(74) *Attorney, Agent, or Firm*—Leslie A. VanLeeuwen; Bracewell & Patterson, L.L.P.

(57) ABSTRACT

Multiple blocks of noncontiguous text displayed in a user interface may be selected by a user and simultaneously manipulated. Actuation of the multiple text selection control by the user creates an array of buffers, with each buffer allocated for one of the noncontiguous blocks of text selected by the user. A paste operation results in the contents of the buffers being concatenated and pasted together as one block. A delete operation results in all selected blocks of text being simultaneously deleted. Other operations may also be performed simultaneously on the multiple blocks of noncontiguous text selected by the user.

20 Claims, 5 Drawing Sheets

The red fox ran past the brown cow and jumped over the fence.

*Fig. 1A*

The red fox ran past the brown cow and jumped over the fence.

*Fig. 1B*

The red fox ran past the brown cow and jumped over the fence.

*Fig. 1C*

The red fox ran past the brown cow and jumped over the fence.

*Fig. 1D*

The red fox ran past the brown cow and jumped over the fence.

*Fig. 1E*

*Fig. 2A*     The red|

*Fig. 2B*     The red cow|

*Fig. 2C*     The red cow jumped|

*Fig. 2D*     The red cow jumped the fence.|

The red fox ran past the brown cow and jumped over the fence.

fox ran past the brown and over

METHOD OF MULTIPLE TEXT SELECTION AND MANIPULATION

BACKGROUND OF THE INVENTION

1. Technical Field

The present invention relates in general to text selection and manipulation in a data processing system and in particular to selection and manipulation of noncontiguous blocks of text. Still more particularly, the present invention relates to selection and manipulation of multiple noncontiguous blocks of text in a data processing system.

2. Description of the Related Art

In data processing systems, text editors ranging from word processors to source code editors to graphical clients composing email need the ability to cut or copy and paste text within a document, or from one document to another. Most user applications supporting text editing provide such cut-and-paste capability, but with the limitation that the text to be manipulated be found in a contiguous block. Noncontiguous blocks of text must be selected, cut or copied, and pasted with separate operations directed at each block of contiguous text.

As one example, suppose a user wishes to edit the sentence of FIG. 1A ("The red fox ran past the brown cow and jumped over the fence."), selecting certain words or phrases from the sentence and pasting them together to form the sentence of FIG. 2D ("The red cow jumped the fence."). With conventional applications, the user must make multiple selections of text, starting with "The red" as illustrated in FIG. 1B. With a graphical user interface, a user would most likely select the text by using a pointing device such as a mouse to move a graphical pointer to the start of the phrase, actuate the pointing device (by pressing a mouse button, for example), and move the graphical pointer to the end of the phrase, leaving the selected text highlighted. The pointing device is then moved to the desired location where the selected text is to be pasted, where the pointing device may be actuated to activate a cursor at the desired location, and the selected text is pasted by, for example, actuating a control key sequence.

By repeating the process described above, the word "cow" is selected as shown in FIG. 1C and pasted as shown in FIG. 2B, the word "jumped" selected as illustrated in FIG. 1D and pasted as shown in FIG. 2C, and the phrase "the fence." is selected as shown in FIG. 1E and pasted as shown in FIG. 2D. The location from which the selected text is cut or copied may be many pages away from the location where it is to be pasted, requiring the user to scroll or page through the entire intervening text twice for each portion of the selected text. Thus, the process of manipulating noncontiguous blocks of text can be both time consuming and annoying, requiring individual text selection, movement, and paste operations for each contiguous block of text.

A variety of circumstances exists under which a user might desire to manipulate noncontiguous blocks of text in a single operation. For example, summarizing lengthy descriptions may be simplified by selecting key phrases from each portion of the description. Editing a quote to eliminate redundant or irrelevant portions is another example. Yet another example is selecting only portions of material displayed from an on-line resource such as the Internet to be pasted into a separate document and/or saved to a local hard disk drive.

It would be desirable, therefore, to be able to cumulatively select noncontiguous words or phrases in one document for copying or cutting and pasting or otherwise manipulating in a single operation. It would further be desirable to be able to paste the selected noncontiguous words and phrases to other portions of the same document or to another document in a single operation as a concatented block of text. It would also be desirable for such capability to permit a variable number of selections of noncontiguous words or phrases, with each selection having a variable length. Finally, it would be desirable for the capability to manipulate noncontiguous blocks of text in a single operation to permit a variety of operations, such as pasting, deletion, and changing fonts.

SUMMARY OF THE INVENTION

It is therefore one object of the present invention to provide and improved method of text selection and manipulation in a data processing system.

It is another object of the present invention to provide an improved method of selection and manipulation of noncontiguous blocks of text in a data processing system.

It is yet another object of the present invention to provide a method of selection and manipulation of multiple noncontiguous blocks of text in a data processing system.

The foregoing objects are achieved as is now described. Multiple blocks of noncontiguous text displayed in a user interface may be selected by a user and simultaneously manipulated. Actuation of the multiple text selection control by the user creates an array of buffers, with each buffer allocated for one of the noncontiguous blocks of text selected by the user. A paste operation results in the contents of the buffers being concatenated and pasted together as one block. A delete operation results in all selected blocks of text being simultaneously deleted. Other operations may also be performed simultaneously on the multiple blocks of noncontiguous text selected by the user.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1A–1E depict sequential selection of words or phrases from a sentence in the display of a data processing system having a graphical user environment;

FIGS. 2A–2D are an illustration of pasting selecting words or phrases to form a sentence in the display of a data processing system;

DETAILED DESCRIPTION OF THE PREFERRED EMBODIMENT

Figure 3:
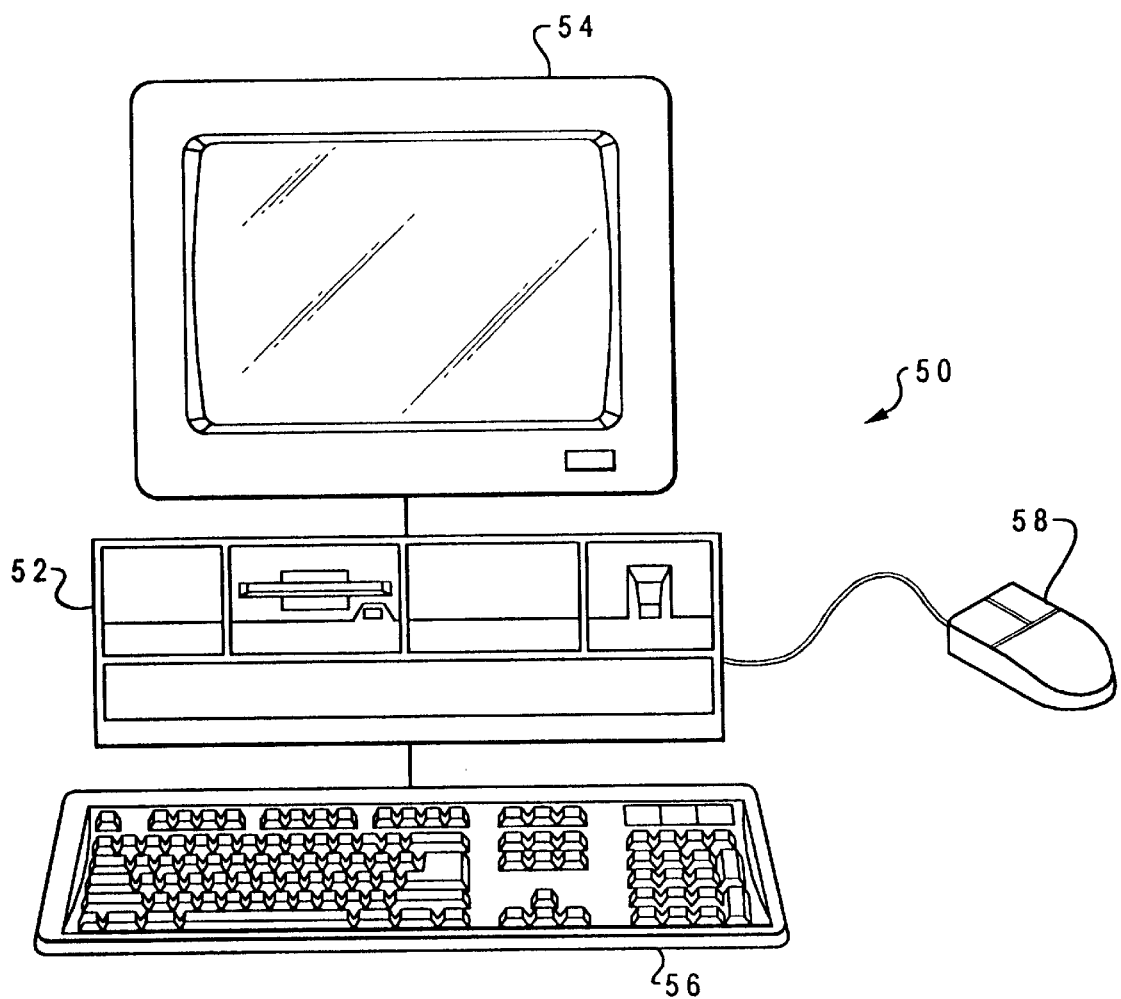
FIG. 3 depicts a pictorial representation of a personal computer that may be utilized to implement a preferred embodiment of the present invention.

With reference now to the figures, and in particular with reference to FIG. 3, a pictorial representation of a personal computer that may be utilized to implement a preferred embodiment of the present invention is depicted. A personal computer 50 is depicted which includes a system unit 52, a video display terminal 54, a keyboard 56, and a mouse 58. Personal computer 50 may be implemented utilizing any suitable computer such as an IBM PC computer, a product of International Business Machines Corporation, located in Armonk, N.Y. Although the depicted embodiment involves a personal computer, a preferred embodiment of the present invention may be implemented in other types of data processing systems, such as for example, laptop or notebook computers, intelligent work stations, or mini-computers.

Figure 4:
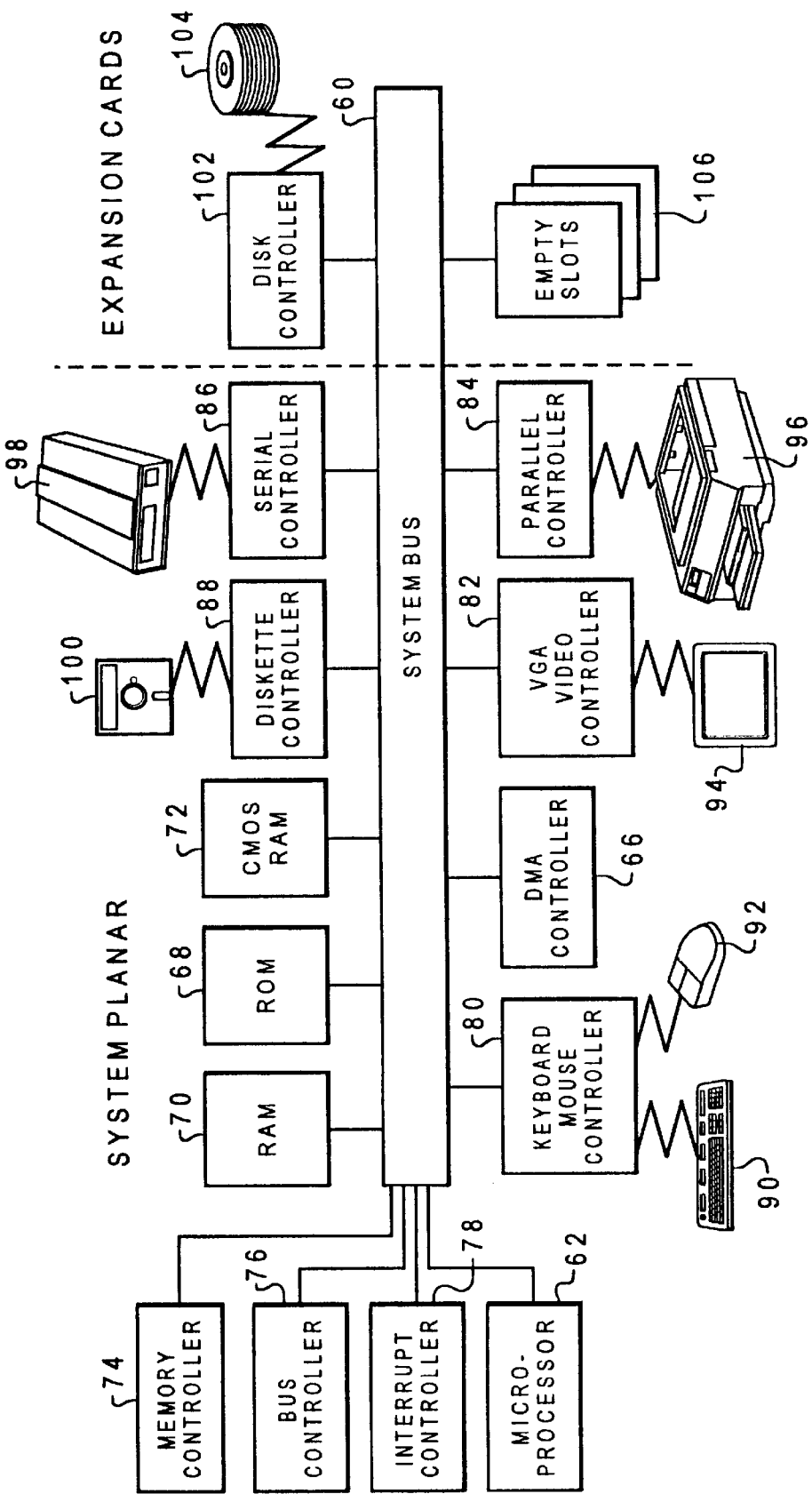
FIG. 4 is a block diagram of selected components in the personal computer represented in FIG. 3 in which a preferred embodiment of the present invention may be implemented.

Referring now to FIG. 4, a block diagram is presented illustrating selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60, as is cache 64. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse or other pointing device 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware illustrated in FIG. 4 may vary for specific applications. For example, a CDROM may be attached to enable the user to utilize reference materials such as an encyclopedia, documentation, or other publications such as a collection of published judicial opinions. Alternatively, a modem may be installed to allow the user access to a variety of on-line resources, including the Internet.

Figures 5, 6, 7:
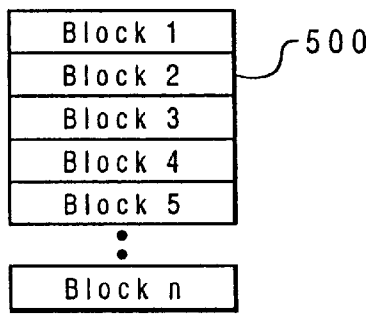
FIG. 5 depicts a data structure used by a preferred embodiment of the present invention.
FIG. 6 is one possible user application display of multiple text block selection in accordance with a preferred embodiment of the present invention.
FIG. 7 depicts a user application display of the sentence of FIG. 1A after being subject of manipulation in accordance with a preferred embodiment of the present invention.

With reference now to FIG. 5, a data structure used by a preferred embodiment of the present invention is depicted. Data structure 500 is a cut-and-paste or text selection buffer comprising an array of buffers, each holding one individual selection of contiguous text. While the text selection buffer may be an array of a fixed size, in accordance with a preferred embodiment of the present invention the array is expandable. That is, when the first text block selection is made, the text selection buffer comprises a single buffer. When the second text block is selected, the text selection buffer is increased in size to include two buffers. This expansion of the text selection buffer continues in the same manner with each text selection so that, upon the nth text selection, the text selection buffer comprises an array of n buffers.

In order to support multiple text selection, a control mechanism or capability for multiple text selection must be added to the user application. For such capability, a control key sequence or pull-down menu option may be used to provide the user with the ability to activate the multiple text selection mechanism. For example, a suitable control key sequence might be "Alt-S", provided that sequence is not already dedicated by the user application for other purposes. Thus, a user might select multiple blocks of non-contiguous text by selecting the first block, pressing Alt-S, selecting the second block, pressing Alt-S, etc. An alternative control mechanism, consistent with the behavior of other common user applications, might require the user to hold down the control key ("Ctrl") while making the multiple selections. Those skilled in the art will recognize that a wide variety of control mechanisms are suitable for activating a multiple text selection feature.

Referring to FIG. 6, one possible user application display of multiple text block selection in accordance with a preferred embodiment of the present invention is illustrated. Typically user applications highlight selected text in the manner depicted in FIGS. 1B–1E. In the case of multiple text selection, the user application may highlight only the most recently selected text block, or may highlight all selected text blocks as illustrated in FIG. 6.

With reference once again to FIG. 5, the selected text blocks are stored or identified in the individual buffers which comprise the text selection buffer. In one embodiment, a copy of the selected text is stored in the individual buffer in the array. This alternative permits faster response to a user-initiated operation such as a paste. If a paste operation is chosen, for example, the contents of the buffers may be concatenated and pasted as one block of text.

In an alternative embodiment for implementing multiple text selection support, copies of the selected text itself are not stored in the individual of the text selection buffer array depicted in FIG. 5. Rather, only an identification of the starting and ending locations for the selected text in the data processing system's memory are stored in the individual buffers. This alternative permits a variety of operations—other than simply copy-and-paste—to be performed on the multiple selections of text blocks. For example, a delete operation might be simultaneously performed on all of the selected text blocks.

In a third alternative of the preferred embodiment of the present invention, both a copy of the selected text and an identification of the starting and ending locations of the text selection in system memory are stored in the individual buffers which make up the text selection buffer array. This allows both fast response to user-initiated operations and flexibility in permitting a variety of operations to be performed on the multiple text selections.

In each of the alternatives, the user may be permitted to select an operation (such as cut or copy) after selecting or highlighting the first desired text block, with subsequent selections of text blocks being treated identically (i.e., cut or copied) until an operation utilizing the contents of the text selection buffer (such as a paste operation) is selected by the user. Preferably, however, the user is required to select all desired text blocks before the operation to be performed on the selected text blocks may be designated. This simplifies execution where the user may chose from a variety of operations to be performed on the multiple text selections.

With reference now to FIG. 7, a user application display of the sentence of FIG. 1A after being subject to manipulation in accordance with a preferred embodiment of the present invention is depicted. The text selections depicted by highlighting in FIG. 6 are made on the sentence displayed in FIG. 1A and a delete operation is chosen, resulting in the sentence displayed in FIG. 7. A cut operation would similarly result in the original sentence of FIG. 1A being changed to that displayed in FIG. 7, while a subsequent paste operation would concatenate the removed text selections and create the sentence of FIG. 2D in a single operation.

Figure 8:
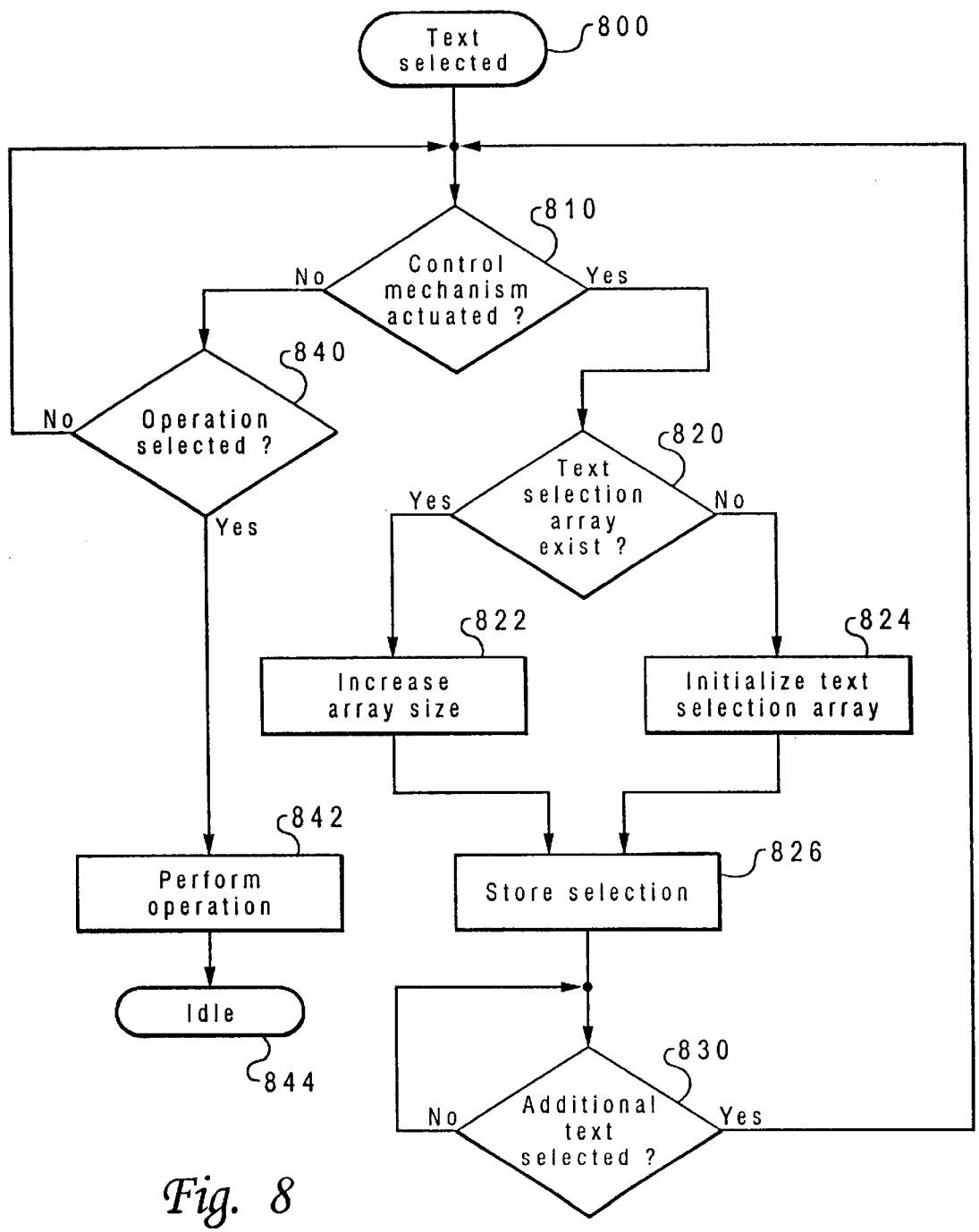
FIG. 8 is a high level flowchart for a method of supporting multiple text selection in accordance with a preferred embodiment of the present invention.

Referring to FIG. 8, a high level flowchart is used to illustrate a method of supporting multiple text selection in accordance with a preferred embodiment of the present invention. The process begins at step 800, which depicts text selection by a user. The process then passes to step 810, which illustrates a determination of whether the control mechanism for multiple text selection has been actuated. If so, the process passes to step 820, which depicts a determination of whether the text selection array already exists. If so, the process proceeds to step 822, which illustrates increasing the size of the text selection array; otherwise the process proceeds to step 824, which depicts initializing the text selection array. From either of steps 822 or 824, the process passes to step 826, which illustrates storing the selected text in an available array buffer as described above. The process next proceeds to step 830, which depicts the process waiting until the user selects additional text. Once additional text is selected by the user, the process returns to step 810.

Referring again to step 810, if the control mechanism supporting multiple text selection has not been actuated by the user, the process passes instead to step 840, which depicts a determination of whether the user has selected an operation using, for example, a control key sequence or a pull-down menu. Steps 810 and 840 together depict the process of waiting until the user either actuates the multiple text selection control mechanism or selects an operation. Once the user selects an operation, the process passes to step 842, which illustrates performance of the selected operation, and then to step 844, which depicts the process becoming idle until further involvement is required.

The present invention allows user applications to support multiple text selection of noncontiguous text blocks in a manner permitting the user to chose from a variety of operations to be performed on the text selections. This function eliminates the necessity of executing copy, move, and paste operations for each block of contiguous text, saving time and expediting a number of common editing processes.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for improved text selection of text displayed on a display in a data processing system, comprising:

displaying a continuous text segment within a word Processor user interface;

responsive to selection of a first block of text within the continuous text segment, indicating the selection of the first block of text on the display;

responsive to an occurrence of a command for multiple text selection, creating an array of buffers each capable of storing a text string of an arbitrary size in a memory in the data processing system;

responsive to selection of a second block of text within the continuous text segment which is not contiguous with the first block of text, indicating the selection of the second block of text on the display; and storing data relating to each block of selected text in a different buffer within the array of buffers.

2. The method of claim 1, further comprising:

responsive to the occurrence of the command for multiple text selection, storing a copy of the first block of selected text in a first buffer within the array of buffers.

3. The method of claim 2, further comprising:

responsive to a second occurrence of the command for multiple text selection, storing a copy of the second block of selected text in a second buffer within the array of buffers.

4. The method of claim 1, wherein the step of creating an array of buffers further comprises:

creating an array having a number of buffers equal to a number of blocks of previously selected text plus one.

5. The method of claim 4, further comprising:

responsive to each occurrence of the command for multiple text selection, increasing the number of buffers in the array of buffers and storing a copy of a last-selected block of text in a last buffer within the array of buffers.

6. The method of claim 5, further comprising:

responsive to a paste command, concatenating copies of blocks of selected text within the array of buffers and displaying the concatenated blocks of selected text on the display.

7. The method of claim 1, wherein the step of storing data relating to each selected block of text within a different buffer within the array of buffers further comprises:

storing, in a first buffer within the array of buffers, a start address in a system memory and an end address in the system memory for the first block of selected text.

8. The method of claim 1, wherein the step of storing data relating to each selected block of text within a different buffer within the array of buffers further comprises:

storing, in a first buffer within the array of buffers, a copy of the first block of selected text, a start address in a system memory for the first block of selected text, and an end address in the system memory for the first block of selected text.

9. A data processing system for improved selection of text displayed on a display in the data processing system, comprising:

display means for displaying a continuous text segment within a word processor user interface;

indication means, responsive to selection of a first block of text within the continuous text segment, indicating the selection of the first block of text on the display;

creation means, responsive to an occurrence of a command for multiple text selection, creating an array of buffers each capable of storing a text string of an arbitrary size in a memory in the data processing system;

indication means, responsive to selection of a second block of text within the continuous text segment which is not contiguous with the first block of text, indicating the selection of the second block of text on the display; and storage means for storing data relating to each block of selected text in a different buffer within the array of buffers.

10. The data processing system of claim 9, further comprising:

memory means, responsive to the occurrence of the command for multiple text selection, for storing a copy of the first block of selected text in a first buffer within the array of buffers.

11. The data processing system of claim 10, further comprising:

memory means, responsive to a second occurrence of the command for multiple text selection, for storing a copy of the second block of selected text in a second buffer within the array of buffers.

12. The data processing system of claim 9, wherein the creation means further comprises:

means for creating an array having a number of buffers equal to a number of blocks of previously selected text plus one.

13. The data processing system of claim 12, further comprising:

memory means, responsive to each occurrence of the command for multiple text selection, for storing a copy of a last-selected block of text in a last buffer within the array of buffers.

14. The data processing system of claim 13, further comprising:

display means, responsive to a paste command, for concatenating copies of the blocks of selected text and displaying the concatenated blocks of selected text on the display.

15. The data processing system of claim 9, further comprising:

memory means for storing, in a first buffer within the array of buffers, a start address in a system memory and an end address in the system memory for the first block of selected text.

16. The data processing system of claim 9, further comprising:

memory means for storing, in a first buffer within the array of buffers, a copy of the first block of selected text, a start address in a system memory for the first block of selected text, and an end address in the system memory for the first block of selected text.

17. A storage device readable by a data processing system and encoding executable instructions for improved selection of text displayed on a display in the data processing system, comprising:

first instruction means for displaying a continuous text segment in a word processor user interface;

second instruction means, responsive to selection of a first block of text within the continuous text segment, indicating the selection of the first block of text on the display;

third instruction means, responsive to an occurrence of a command for multiple text selection, creating an array of buffers each capable of storing a text string of an arbitrary size in a memory in the data processing system;

fourth instruction means, responsive to selection of a second block of text within the continuous text segment which is not contiguous with the first block of text, indicating the selection of the second block of text on the display; and fifth instruction means for storing data relating to each selected block of text in a different buffer within the array of buffers.

18. The storage device of claim 17, wherein the storage device is a hard disk drive.

19. The storage device of claim 17, wherein the storage device is a ROM for use within the data processing system.

20. The storage device of claim 17, wherein the storage device is a floppy diskette.

* * * * *